United States Patent
Huck

(10) Patent No.: US 11,454,995 B2
(45) Date of Patent: Sep. 27, 2022

(54) FITTING DEVICE AND RETROFITTING METHOD

(71) Applicant: AQUIS SYSTEMS AG, Rebstein (CH)

(72) Inventor: Kai Huck, Diepoldsau Wetter (CH)

(73) Assignee: Aquis Systems AG, Rebstein (CH)

(*) Notice: Subject to any disclaimer, the term of this patent is extended or adjusted under 35 U.S.C. 154(b) by 55 days.

(21) Appl. No.: 16/906,060

(22) Filed: Jun. 19, 2020

(65) Prior Publication Data
US 2020/0333812 A1    Oct. 22, 2020

Related U.S. Application Data

(63) Continuation of application No. PCT/EP2018/084194, filed on Dec. 10, 2018.

(30) Foreign Application Priority Data

Dec. 20, 2017   (DE) ............... 10 2017 130 684.6

(51) Int. Cl.
    *G05D 23/13*     (2006.01)
    *E03C 1/04*      (2006.01)
(52) U.S. Cl.
    CPC ......... *G05D 23/1353* (2013.01); *E03C 1/041* (2013.01); *E03C 1/04* (2013.01)
(58) Field of Classification Search
    CPC ........ G05D 23/1353; E03C 1/041; E03C 1/04
    See application file for complete search history.

(56) References Cited

U.S. PATENT DOCUMENTS

| 1,195,722 | A |   | 8/1916  | Powers et al. |
| 3,112,879 | A |   | 12/1963 | Killias       |
| 3,929,282 | A |   | 12/1975 | Doll          |
| 4,877,181 | A | * | 10/1989 | Stewart ............ G05D 23/1353 |
|           |   |   |         | 236/12.17 |
| 9,709,185 | B1| * | 7/2017  | Kuo ........................ E03C 1/04 |

(Continued)

FOREIGN PATENT DOCUMENTS

| CH | 560 343 A5   | 3/1975 |
| DE | 23 40 790 A1 | 3/1975 |

OTHER PUBLICATIONS

International Preliminary Report on Patentability (Chapter I) (Application No. PCT/EP2018/084194) dated Jul. 2, 2020.

(Continued)

*Primary Examiner* — Patrick C Williams
(74) *Attorney, Agent, or Firm* — Burr & Brown, PLLC

(57) ABSTRACT

A fitting device for delivering mixed water, comprising a first inflow line for feeding hot water and a second inflow line for cold water, wherein the first and second inflow lines lead into a mixing chamber for mixing cold and hot water, wherein provision is made of a first shut-off device for controlling and/or for shutting off the flow from the first inflow line into the mixing chamber, wherein the first shut-off device has a temperature-sensitive element to control the flow from the first inflow line in a manner dependent on the temperature, wherein the second inflow line has an inflow to the mixing chamber that is formed independently of the first shut-off device, wherein the mixing chamber has an outlet line for the outflow of the mixed water, wherein provision is made of a temperature-setting device for setting the temperature of the mixed water.

8 Claims, 3 Drawing Sheets

(56) References Cited

U.S. PATENT DOCUMENTS

2003/0006315 A1  1/2003  Nakamura
2009/0000026 A1  1/2009  Hanson
2010/0288386 A1  11/2010 Westarp

OTHER PUBLICATIONS

Chinese Office Action (Application No. 201880082842.2) dated Mar. 1, 2021 (with English translation).
International Search Report and Written Opinion (Application No. PCT/EP2018/084194) dated Mar. 25, 2019.
European Office Action (Application No. 18830401.8) dated Jun. 27, 2022.

* cited by examiner

FITTING DEVICE AND RETROFITTING METHOD

CROSS REFERENCE TO RELATED APPLICATIONS

This application is a continuation of International Application No. PCT/EP2018/084194 filed Dec. 10, 2018, which designated the United States, and claims the benefit under 35 USC § 119 (a)-(d) of German Application No. 10 2017 130 684.6 filed Dec. 20, 2017, the entireties of which are incorporated herein by reference.

FIELD OF THE INVENTION

The present invention relates to a fitting device, in particular a domestic or sanitary fitting, and to a retrofitting method for the retrofitting of the corresponding fitting.

BACKGROUND OF THE INVENTION

Various fittings for setting the water temperature are known from the prior art. In the case of conventional thermostatic mixers, a so-called regulating piston is arranged between the hot-water inflow and the cold-water inflow and is provided on both sides, that is to say toward the hot-water inflow and toward the cold-water inflow, with conical or frustoconical closure elements and can consequently be displaced between the hot-water inflow and the cold-water inflow. According to the positioning, it is set in this manner by the regulating piston whether the mixed water which is finally delivered from the fitting contains proportionally more cold water or more hot water, that is to say is hotter or colder. Furthermore, the regulating piston is coupled to a temperature-sensitive element such that, in the case of a particular temperature being exceeded, less hot water and instead more cold water is added to the mixed water.

SUMMARY OF THE INVENTION

It is the object of the present invention to propose a fitting device which can offer a higher degree of safety and improved scalding protection.

The fitting device according to the present invention may be used, for example, as a sanitary fitting or domestic fitting. It serves for delivering mixed water, wherein an operator can set the quantity and temperature of the mixed water to be delivered at the fitting. Initially, the fitting device according to the present invention comprises a first inflow line for feeding hot water and a second inflow line for feeding cold water. Both inflow lines, that is to say the first and second inflow lines, open into a mixing chamber, with the result that hot and cold water can be mixed in the latter so as to be able to produce mixed water of a particular temperature.

In particular, the fitting device according to the present invention is characterized in that provision is made of a first shut-off device for controlling and/or for shutting off the flow from the first inflow line into the mixing chamber. The first shut-off device has in this case a temperature-sensitive element to control the flow from the first inflow line in a manner dependent on the temperature, in particular, to reduce the flow with increasing temperature. Here, the first shut-off device controls only the flow of the first inflow line, that is to say the hot-water inflow. The fitting device is furthermore characterized in that the second inflow line has an inflow to the mixing chamber that is formed independently of the first shut-off device. By contrast to the prior art, it is consequently the case that only the hot-water inflow is regulated via the first shut-off device.

The mixing chamber in turn accordingly has an outlet line for the outflow of the mixed water from the fitting device. Furthermore, provision is made of a temperature-setting device for setting the temperature of the mixed water, in order that the user or the operator can set the temperature of the mixed water to a desired value. In the fitting device according to the present invention, the temperature-setting device can be formed such that it:

either can set only the inflow from the first inflow line, while the inflow from the second inflow line remains independent of the temperature-setting device, or
can set both the inflow from the first inflow line and the inflow from the second inflow line in relation to one another in order, for example, to obtain a constant volume flow via the outlet line.

In the preferred embodiment, the temperature-setting device sets only the inflow from the first inflow line, that is to say only the hot-water inflow.

Safety can in any case be increased to a particular degree by the fitting device according to the present invention. There can occur, for example, in the water inflow pressure variations or temperature variations, for example, with a cold water failure, with pressure variations in the cold-water line, or overall temperature variations, be it due to regulation problems with a heat pump connected for heating the water or with another heat supply system. In this way, effective and direct scalding protection can be achieved, since the hot-water feed (first inflow line) is accessed solely on the basis of a measurement at the mixed water and exclusively the hot-water feed is regulated. Furthermore, the present invention also makes possible a space-saving implementation within an existing fitting device.

Advantageously, the setting of the temperature is in this respect more uniform and subjected to smaller variations since only the hot water is accessed and only one parameter (the inflow quantity) of the hot water is regulated. It is, thus, not immediate that the quantity of fed cold water is also changed.

It is conceivable, as has already been stated above, for the temperature-setting device, in one exemplary embodiment of the present invention, to be connected in series with the first shut-off device. In this way, it is possible for both, that is to say the first shut-off device and the temperature-setting device, to be operated independently of one another, and both devices, by way of the series connection, then accordingly determine the water temperature in the outlet line. Even if the user, with the aid of the temperature-setting device, sets a very high water temperature, which is higher than the maximum temperature predefined via the first shut-off device, the temperature of the mixed water is still regulated to the permissible maximum temperature. This embodiment has the advantage that the user can perform temperature settings essentially in the usual manner, without it being the case that the settings would basically change for a different setting of the first shut-off device, at least as long as the maximum temperature, set at the first shut-off device, is not exceeded.

It is, however, also conceivable for the temperature-setting device and the first shut-off device to be coupled to one another. For example, the first inflow line can be shut off via a valve which has a closure body which pushes against a seal. The position of the seal in relation to the closure body can be set via the temperature-setting device in that the quantity of water which passes into the mixing chamber via the first inflow line, that is to say the magnitude of the proportion of hot water in relation to the proportion of cold water, is predefined via the temperature-setting device. Moreover, the position of the closure body in relation to the seal is also changed in that, in the case of excessively hot water, the first shut-off device of the closure body moves until the latter comes into abutment with the seal and shuts off the hot-water feed via the first inflow line. This measure in turn has the advantage that a particularly compact design is possible.

In one preferred embodiment variant of the present invention, the first shut-off device comprises an expansion element, as a temperature-sensitive element, and a piston, which has a closure body coupled thereto, such that, upon expansion and/or contraction of the expansion element, the piston is displaced, wherein the piston is mounted in relation to a piston seat seal such that the piston shuts off the flow if it and/or the closure body are/is pushed against the piston seat seal and opens the flow if it is removed from the piston seat seal. If a coupling of first shut-off device and temperature-setting device is provided, then the temperature-setting device can, for example, predefine the position of the piston seat seal, that is to say the piston seat seal is displaced in relation to the piston, with the result that the throughflow quantity of water can be set. The use of an expansion element is advantageously characterized in that the expansion element substantially covers the temperature range relevant to conventional sanitary and domestic fittings during the regulation and provides a direct response within seconds, that is to say the expansion element can perform a shut-off action in a timely manner, so as to be able to prevent scalding. Generally here, the displacement of the slide which is coupled to the expansion element is proportional to the temperature-induced increase in volume.

In order to make possible the most precise possible setting or the most precise possible scalding protection, it is advantageous that to arrange or to form temperature-sensitive element such that it exclusively determines the temperature in the mixing chamber. The mixing chamber contains the water actually discharged, which passes out of the fitting via the outlet line, and so the actual temperature of said water is also decisive for the scalding protection. Basically, pressure variations can occur in the cold-water line, and also the temperatures of the fed cold or warm water can vary. These too influence the temperature of the mixed water. For example, in the case of constant hot-water inflow at constant temperature, the temperature of the mixed water can vary because the pressure in the cold-water inflow line is changed, or because the temperature of the fed cold water varies.

In the embodiment variant of the present invention, the second inflow line for guiding cold water opens into the mixing chamber directly and/or without a shut-off device or some other control device. As already stated above, when setting the temperature, only one parameter is then changed, specifically the quantity of fed hot water in relation to the fed cold water. The regulation can thereby be simplied overall.

In one refinement of the present invention, the second inflow line, that is to say the cold-water feed, may be provided with a constant volume flow regulation means, with the result that the temperature parameter is regulated only via the fed quantity of hot water. Besides a simplified temperature setting, this, however, also makes it possible for any pressure variations in the second inflow line, which can arise generally in the water lines due to external circumstances, to be able to be evened out.

In turn, the piston, which is displaceable, for example, via the expansion element, may in turn be mounted such that it works in a direction of movement, in particular in the direction of the piston seat seal, counter to an elastic element, such as, for example, a spring. In this way, it is ensured that, in the case of changed temperature conditions, the piston not only responds quickly if the temperature is increased but also is displaced quickly back in the opposite direction upon reduction of the temperature. If appropriate, it is possible to directly and quickly reestablish the state prior to the regulation.

Advantageously, a structural unit comprises at least the first shut-off device and the piston and the piston seat seal and the expansion element and the temperature-sensitive element and a restoring element, which is in the form of the elastic element in particular and serves for resetting the piston, and/or the temperature-setting device. If appropriate, the structural unit is of two-part form, wherein the temperature-setting device is realized as a separately handlable or second part. In this way, it is achieved that, for realizing the function according to the present invention, or in the case of a retrofit, a replacement or a demounting of the entire fitting or of the various individual fitting components is not necessary. This is highly advantageous specifically with regard to retrofitting, maintenance/service or repair. The entire demountable and mountable structural unit according to the present invention can thus be advantageously removed, for example, in the event of an impairment or fault, and a new structural unit can be inserted in its place. This improves the economical operation of the sanitary fitting according to the present invention.

In the exemplary embodiment of the present invention, provision is advantageously made of a setting device for setting the flow of the mixed water from the fitting device. The setting device allows an operator to basically set the quantity of water per time unit or the quantity of mixed water per time unit delivered by the fitting. In order that the quantity of water discharged via the outlet line basically remains constant, the setting device may also interact with a constant volume flow regulation means or with a second shut-off device for the second inflow line. Thus, if, for example, the quantity of hot water passed into the mixing chamber is reduced, then it is basically necessary for a larger quantity of cold water to flow to the mixing chamber in order that a constant volume flow can flow out via the outlet line. Such a reduction of the hot-water inflow into the mixing chamber may, however, also be brought about in that, for example, the maximum temperature selected in connection with the first shut-off device has been exceeded and the water flowing out of the mixing chamber is too hot. However, it is also conceivable for this circumstance to be indicated to the operator in that follow-up regulation of the delivered quantity of water per time unit is deliberately omitted and the user immediately notices that less water is flowing out of the fitting in this case. The operator can thereby immediately conclude that the temperature regulation means at the fitting is possibly set incorrectly, and he or she has to set the temperature lower because a maximum temperature has been exceeded and consequently a safety regulation means, such as the first shut-off device, had to intervene.

It is basically possible for provision to be made of a second shut-off device for the second inflow line to control the flow from the second inflow line, for example, in a manner dependent on the setting device. It is, therefore, also conceivable that the entire flow through the fitting device or the mixed water delivered from the mixing chamber, which finally flows out of the fitting device, is regulated not as a whole after the mixing process in the mixing chamber, but rather as individual parts in the respective inflow lines upstream of the mixing chamber. If appropriate, the second shut-off device may also be coupled to a constant volume flow regulation means.

The second shut-off device may, in particular, be in the form of a throughflow limiter for setting a minimum flow, or use may be made thereof in addition to the second shut-off device. A minimum inflow of cold water is required in order that the temperature is not too close to the maximum possible water temperature. The maximum possible water temperature is reached if only the hot-water line is open, that is to say only or almost exclusively water from the hot-water line (first inflow line), but no or only very little water from the cold-water line, passes into the mixing chamber.

Particularly advantageously, a retrofitting method for the retrofitting of a fitting having a fitting device according to the invention or according to one of the above-stated exemplary embodiments is characterized in that an existing temperature-mixing device is replaced by the fitting device, wherein particularly advantageously, in the refinement of the present invention, the fitting has a structural space in the interior (in the form of a structural space of a commercially available mixer shaft), and the fitting device can be completely accommodated in the structural space. This measure firstly provides a particular advantage in terms of cost because it is not necessary for the entire fitting to be replaced. A further advantage is that manufacturers do not need to completely replace fittings already available in serial production, but rather can possibly even retrofit the fittings.

BRIEF DESCRIPTION OF THE INVENTION

An exemplary embodiment of the present invention is illustrated in the drawings and is discussed in more detail below, with further details and advantages being specified.

DETAILED DESCRIPTION OF THE INVENTION

Figure 1:
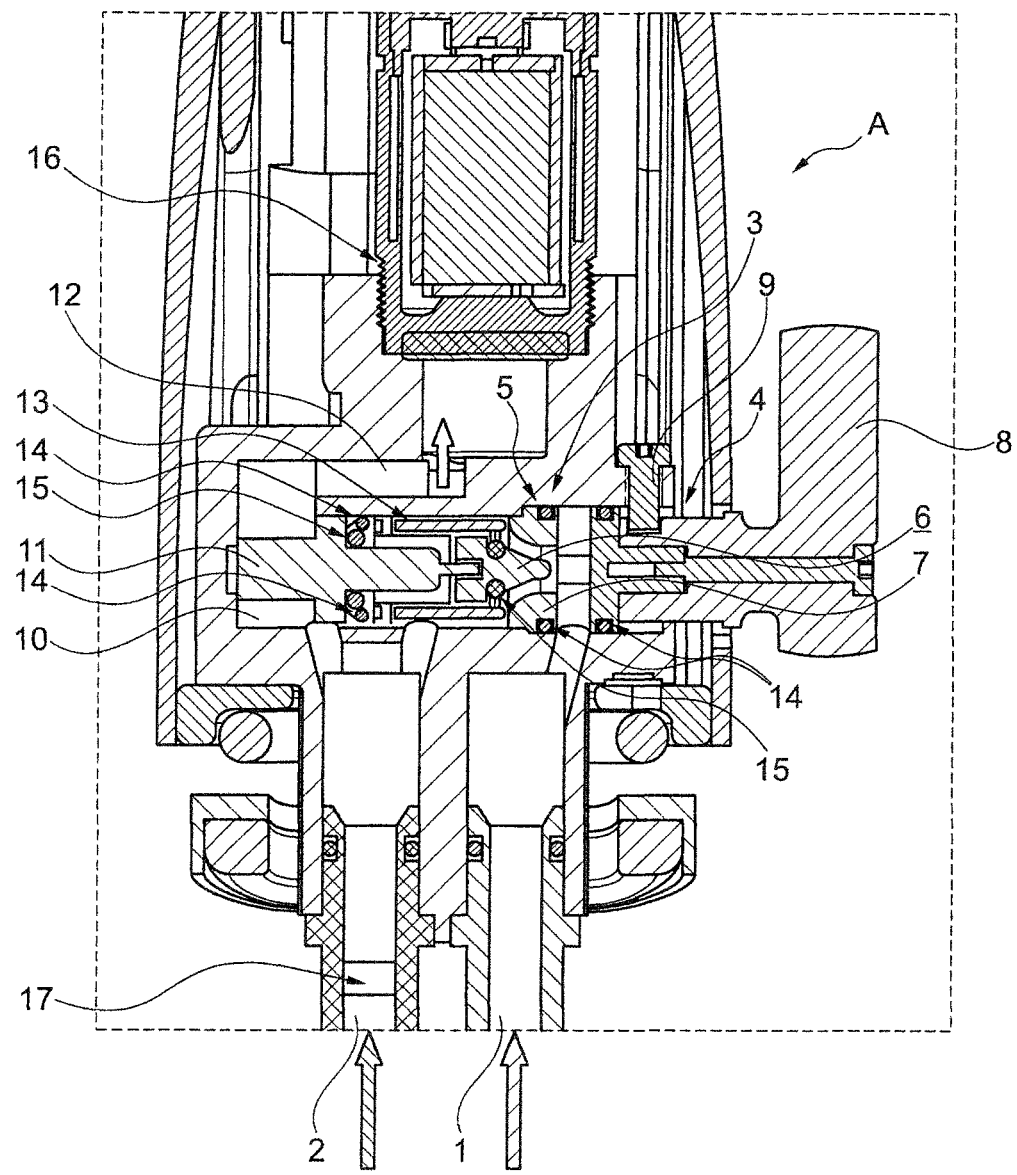
FIG. 1 shows a sectional illustration of a sanitary fitting according to the present invention.

FIG. 1 shows a sanitary fitting A having a first and a second inflow line 1, 2 for feeding hot and cold water. The inflow 1 via the hot-water line can be regulated by a valve device 3 which forms both the temperature-setting device 4 and the first shut-off device 5 as scalding protection. This device 3 comprises a piston 6 and a piston seat seal 7. The piston seat seal 7 couples to the temperature-setting lever 8, which is mounted rotatably for setting purposes. The maximum possible angle of rotation of the temperature-setting lever 8 is predefined by a stop screw 9.

Figure 3:
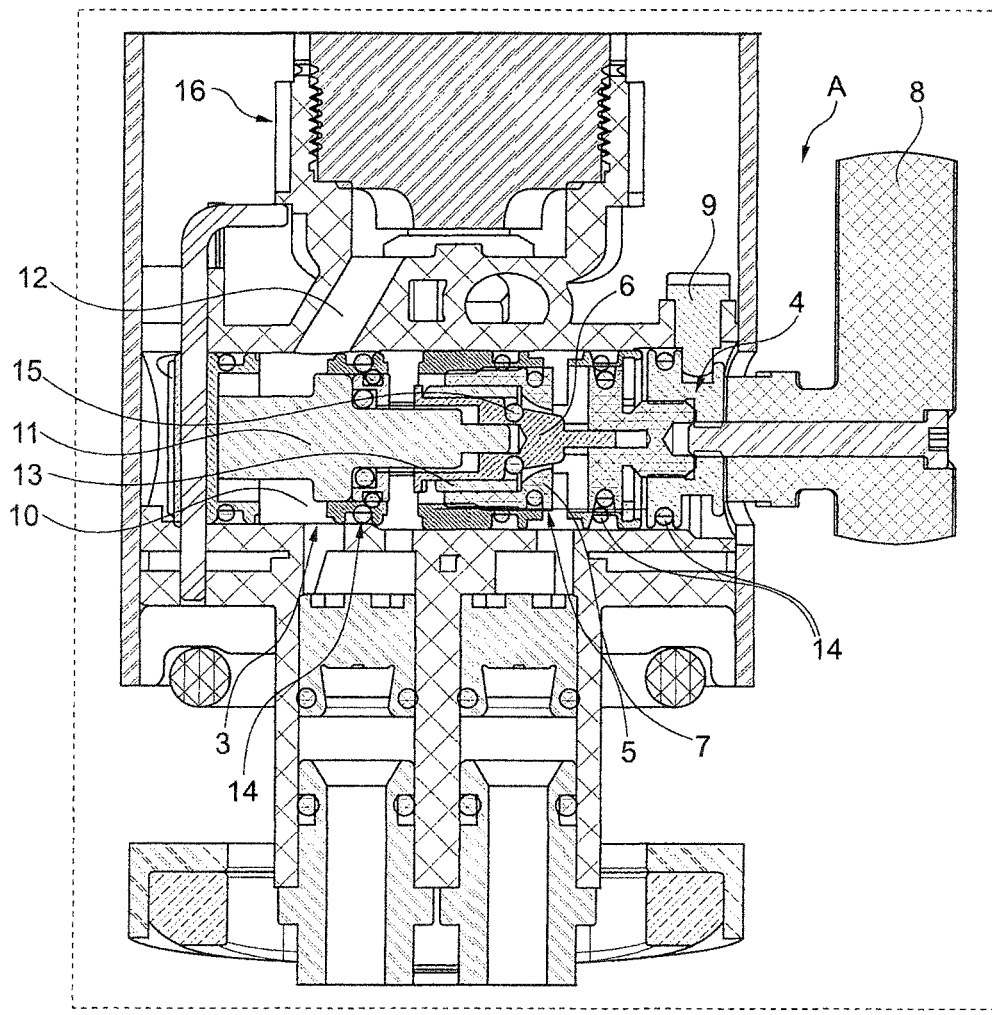
FIG. 3 shows a schematic illustration of a second sanitary fitting according to the present invention.

The valve device 3, in a preferred second variant of the present invention (as illustrated in FIG. 3), is preferably realized as a separately handlable structural unit 3. In the second variant illustrated in FIG. 3, the structural unit 3 comprises two units, specifically the temperature-setting device 4, as a separately handlable part, and, as the second unit, the remaining, aforementioned components. In this way, it is achieved that, for example, during a retrofit or a replacement or a demounting, the entire structural unit 3 can be demounted without great effort and a new structural unit 3 can be mounted in its place. It is consequently not necessary for the entire fitting or all the correspondingly individual components to be demounted and remounted. This is highly advantageous, specifically with regard to retrofitting, maintenance/service or repair. The entire structural unit 3 according to the present invention can thus be advantageously removed, for example, in the event of an impairment or fault, and a new structural unit 3 can be inserted in its place.

For example, the structural unit 3 can be demounted in that a stop screw 9 is loosened such that the temperature-setting lever 8, with the temperature-setting device 4, becomes releasable or is able to be taken out of a sanitary fitting A. Subsequently or together with the temperature-setting device 4, it is then possible for components of the fitting, such as shut-off device 5, piston 6, piston seat seal 7, expansion element 11, spring 13 and various seals 14, 15, to be jointly removed or demounted as the structural unit 3 according to the present invention. In the event of an impairment or a fault, a new, functioning or intact structural unit 3 can then be mounted as a replacement. This saves time and improves the cost-effectiveness of the present invention.

As an alternative according to the invention, it is also possible for the temperature-setting device 4 to have a separate valve, by way of which the first inflow line can be set, that is to say in this case the temperature-setting device 4 works in a manner decoupled from the first shut-off device 5.

The second inflow line 2 (cold water) opens into a mixing chamber 10. An expansion element 11 is connected to the mixing chamber 10, with the result that the heat of the liquid in the mixing chamber 10 can be transferred to the expansion element 11. The expansion element 11 in turn couples to the piston 6. As the temperature of the water in the mixing chamber 10 increasingly rises, the expansion element 11 is also heated and expands more and more. The expansion element 11 is selected or set such that, if the temperature is too high, it pushes the piston 6 against the piston seat seal 7 and shuts off the inflow of the first inflow line 1 into the mixing chamber 10. The inflow of hot water is, therefore, reduced or prevented, with the result that the water temperature in the outlet line 12, which is arranged downstream of the mixing chamber 10, drops.

During heating, the expansion element 11 expands counter to the force of a spring 13. During cooling, the spring 13 ensures that the piston 6 is quickly removed from the piston seat seal 7 again.

Seals are denoted by the reference signs 14, 15 in FIG. 1.

The volume flow which is delivered via the fitting A via the outlet line 12 can be controlled via the setting device 16 in the form of a solenoid valve.

Furthermore, provision is made of a second shut-off device 17, which is in the form of a rotating sleeve in this case, for the purpose of being able to control the volume flow of the cold water.

Figure 2:
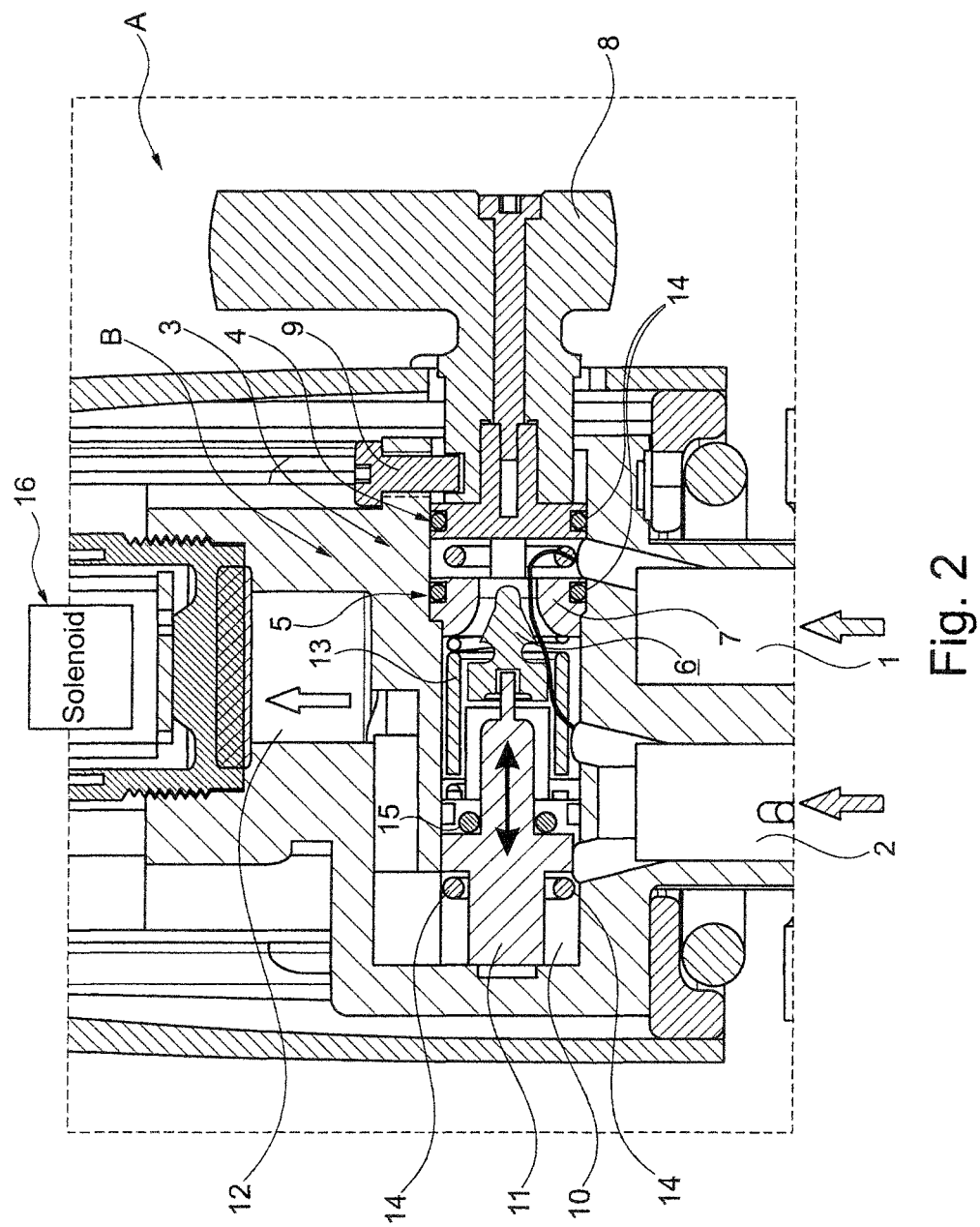
FIG. 2 shows an enlarged illustration of the fitting device from FIG. 1.

FIG. 2 shows an enlarged illustration of a part of the fitting device A. It shows, in particular, the structural space (B) in the interior for accommodating the temperature-mixing device, into which a corresponding, space-saving fitting device A can be retrofitted without the remaining housing of an existing sanitary fitting having to be replaced.

LIST OF REFERENCE SIGNS

1 First inflow line
2 Second inflow line
3 Valve device

4 Temperature-setting device
5 First shut-off device
6 Piston
7 Piston seat seal
8 Temperature-setting lever
9 Stop screw
10 Mixing chamber
11 Expansion element
12 Outlet line
13 Spring
14, 15 Seals
16 Setting device
17 Second shut-off device
A Sanitary fitting
B Structural space

The invention claimed is:

1. A sanitary fitting device for delivering mixed water, the sanitary fitting device comprising:
a first inflow line for feeding hot water;
a second inflow line for feeding cold water;
a mixing chamber, wherein the first and second inflow lines lead into the mixing chamber to mix the cold and hot water therein;
a first shut-off device for controlling and/or for shutting off a flow of the hot water from the first inflow line into the mixing chamber;
a temperature-setting device for setting a temperature of the mixed water; and
a flow setting device for setting a flow of the mixed water from the sanitary fitting device,
wherein the first shut-off device has a temperature-sensitive element to control the flow from the first inflow line depending on the temperature of the hot water to reduce the flow with an increase in the temperature of the hot water,
wherein the first shut-off device comprises an expansion element as the temperature-sensitive element, and a piston coupled to the expansion element, such that, upon expansion and/or contraction of the expansion element, the piston is displaced,
wherein the piston is mounted in relation to a piston seat seal such that the piston shuts off the flow if it is pushed against the piston seat seal and opens the flow if it is removed from said piston seat seal,
wherein the piston is mounted such that it works in a direction of movement toward the piston seat seal, counter to an elastic element,
wherein the second inflow line has an inflow to the mixing chamber that is formed independently of the first shut-off device,
wherein the second inflow line opens directly into the mixing chamber and/or opens into the mixing chamber without a shut-off device and/or control device, and
wherein the mixing chamber has an outlet line for the outflow of the mixed water.

2. The fitting device as claimed in claim 1, wherein the temperature-setting device is connected in series with the first shut-off device.

3. The fitting device as claimed in claim 1, wherein the temperature-setting device is coupled to the first shut-off device in order to set and/or to regulate the flow from the first inflow line into the mixing chamber.

4. The fitting device as claimed in claim 1, wherein the temperature-sensitive element is arranged and/or formed such that it exclusively determines the temperature in the mixing chamber.

5. The fitting device as claimed in claim 1, wherein the elastic element is a spring.

6. The fitting device as claimed in claim 5, further comprising a structural unit that comprises at least the first shut-off device and/or the piston and/or the piston seat seal and/or the expansion element and/or the temperature-sensitive element and/or the elastic element and/or the temperature-setting device.

7. A method for retrofitting of fitting having the structural unit according to claim 6, the method comprising replacing an existing temperature-mixing device with the structural unit, wherein the fitting has an interior structural space for accommodating the temperature-mixing device, and the structural unit is completely accommodated in the interior structural space of the fitting.

8. A method for retrofitting a fitting with a sanitary fitting device as claimed in claim 1, the method comprising replacing an existing temperature-mixing device with the sanitary fitting device, wherein the fitting has an interior structural space for accommodating the temperature-mixing device, and wherein the sanitary fitting device is completely accommodated in the structural space of the fitting.

* * * * *